United States Patent
Zinner (10) Patent No.: US 11,251,891 B2
(45) Date of Patent: Feb. 15, 2022

(54) METHOD FOR IDENTIFYING AN INCORRECT TIME STAMP OF AN ETHERNET MESSAGE AND CONTROL UNIT FOR A MOTOR VEHICLE

(71) Applicant: CONTINENTAL AUTOMOTIVE GMBH, Hannover (DE)

(72) Inventor: Helge Zinner, Munich (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/759,478

(22) PCT Filed: Oct. 23, 2018

(86) PCT No.: PCT/EP2018/078961
§ 371 (c)(1),
(2) Date: Apr. 27, 2020

(87) PCT Pub. No.: WO2019/081463
PCT Pub. Date: May 2, 2019

(65) Prior Publication Data
US 2020/0295861 A1    Sep. 17, 2020

(30) Foreign Application Priority Data
Oct. 23, 2018   (DE) .................. 102017219209.7

(51) Int. Cl.
*H04J 3/06* (2006.01)
*H04J 3/14* (2006.01)

(52) U.S. Cl.
CPC .............. *H04J 3/14* (2013.01); *H04J 3/0661* (2013.01)

(58) Field of Classification Search
CPC ....... H04L 43/10; H04L 43/16; H04L 43/028; H04J 3/06; H04J 3/14; H04J 3/0661
See application file for complete search history.

(56) References Cited

U.S. PATENT DOCUMENTS

| 10,154,058 B2 | 12/2018 | Zinner |
| 2004/0151125 A1 | 8/2004 | Holmeide et al. |

(Continued)

FOREIGN PATENT DOCUMENTS

| CN | 105577349 A | 5/2016 |
| DE | 102013224697 A1 | 6/2015 |
| DE | 102015213845 A1 | 1/2017 |

OTHER PUBLICATIONS

Andreas Kern et al.: "Accuracy of Ethernet AVB Time Synchronization under Varying Temperature Conditions for Automotive Networks", Design Automation Conference (DAC), 2011 48TH ACM/EDAC/IEEE, IEEE, Jun. 5, 2011, (Jun. 5, 2011), ISBN 978-1-4503-0636-2, pp. 597-602, XP031927788.

(Continued)

*Primary Examiner* — Abdelnabi O Musa
(74) *Attorney, Agent, or Firm* — Laurence A. Greenberg; Werner H. Sterner; Ralph E. Locher (57) ABSTRACT

A method identifies an incorrect time stamp of an Ethernet message. Initially, an Ethernet message is received which contains a time stamp from a control unit of a motor vehicle. A time difference is determined between a global time of the time stamp and a local time of a clock of the control unit. The time stamp of the Ethernet message is identified as incorrect. The global time of the time stamp is replaced by the local time of the clock of the control unit if the time stamp is identified as incorrect.

11 Claims, 5 Drawing Sheets

(56) References Cited

U.S. PATENT DOCUMENTS

| | | | | |
|---|---|---|---|---|
| 2009/0222589 A1* | 9/2009 | Kirsch | ................. | H04J 3/0676 |
| | | | | 709/248 |
| 2013/0038358 A1* | 2/2013 | Cook | ................... | G04R 20/06 |
| | | | | 327/141 |
| 2013/0094372 A1* | 4/2013 | Boot | ..................... | H04L 43/10 |
| | | | | 370/252 |
| 2016/0087738 A1* | 3/2016 | Jeon | ..................... | H04J 3/0667 |
| | | | | 370/350 |
| 2016/0189114 A1* | 6/2016 | Cattone | ............... | G06Q 10/087 |
| | | | | 705/28 |
| 2017/0280416 A1* | 9/2017 | Zalewski | .............. | H04L 43/106 |
| 2018/0232037 A1* | 8/2018 | Darin | .................... | B60L 58/10 |
| 2019/0112075 A1* | 4/2019 | Kalmar | .................. | G07C 3/14 |

OTHER PUBLICATIONS

Radu Onica et al.: "Fault-Tolerant Precision Time Protocol for Smart Grids", Simpósio De Informática (INFORUM), Covilhã, Portugal, Sep. 8, 2015, (Sep. 8, 2015), XP055538050.

IEEE Std 1588-2008: "IEEE Standard for a Precision Clock Synchronization Protocol for Networked Measurement and Control Systems", IEEE Instrumentation and Measurement Society, Jul. 24, 2009 (Revision of IEEE Std 1588-2002) (Uploaded as Part 1, Part 2 and Part 3).

* cited by examiner

METHOD FOR IDENTIFYING AN INCORRECT TIME STAMP OF AN ETHERNET MESSAGE AND CONTROL UNIT FOR A MOTOR VEHICLE

BACKGROUND OF THE INVENTION

Field of the Invention

The invention relates to a method for identifying an incorrect time stamp of an Ethernet message. A control unit receives an Ethernet message containing a time stamp. The invention also relates to a control unit for a motor vehicle. The control unit is designed to receive an Ethernet message containing a time stamp.

Ethernet technologies are known for electrical systems of motor vehicles. The Ethernet AVB (Audio Video Bridging) standard and also Ethernet TSN (Time-Sensitive Networking), the successor to this standard, are considered in particular as protocols. Ethernet AVB is already in development for mass production. A sub-standard of Ethernet AVB is currently the synchronization standard IEEE 802.1AS, which is derived from standard IEEE 1588. Both standards use the Precision Time Protocol (PTP) in order to create a common time reference in an Ethernet network.

PTP defines three mechanisms here: measuring the line delay between adjacent nodes, determining the best clock, and transferring time information. The function of the peer delay mechanism is to measure the delay between two connected ports. The measured transit time is used to correct the time information at the nodes and to take this time into account. Delay_Request messages are used periodically by both communication partners independently of each other. If the node concerned is IEEE 802.1AS-compliant, then it will reply with a Delay_Response message and a Pdelay_Resp_Follow_Up message. These messages are given a hardware time stamp on arrival and forwarded to the PTP application. The latency and the time difference with regard to the adjacent port can be determined thereby.

Three PTP mechanisms are known in particular. A port (the initiator) starts the measurement by sending a Delay_request message to the port to which it is connected (the responder) and generating an outgoing time stamp. This outgoing time stamp refers to a hardware time stamp, which is written as late as possible on leaving the Ethernet transceiver. On arrival of this packet, the responder generates a receive time stamp. In response, the responder sends a Delay_Response message. In this message, it transmits the receive time stamp of the Delay_Request message. Once this message has left the responder, the responder again generates a time stamp, which is sent out in an immediately following Delay_Response_Follow_up message. On receiving the Delay_Response message, the initiator in turn generates an additional receive time stamp. The initiator can calculate from the four time stamps the average transit time for the traveled path.

PTP defines a master/slave clock hierarchy using a best clock within an AVB network. The time base for the nodes in this network is derived from this clock, the grandmaster. The Best Master Clock Algorithm (BMCA) is used to find this clock type and to announce this information in the network. IEEE 802.1AS-compliant systems periodically send to their neighbor nodes Announce messages containing information about the best clock in the AVB Cloud. The recipient of such a message compares this information with the properties of its own clock and with the messages that may already have been received from another port. A time synchronization tree is constructed on the basis of these messages. In this process, each port is assigned one of four port statuses. The "master port" status is given to the port that has a shorter route to the grandmaster than its connection partner. The "slave port" status is assigned when no other port at this node yet has this status. The port that cannot fully support the PTP protocol adopts the "disabled" "status". The "passive" status is chosen if none of the other three statuses apply.

Finally, the time information is transferred by the Sync_Follow_Up mechanism. The master ports periodically send Sync and Follow_Up messages to the adjacent connection partner. When the Sync message leaves the master port, a time stamp is generated, which is transmitted immediately in a subsequent Follow_Up message. This time stamp equals the clock time of the grandmaster at the instant the Sync message was sent. The messages originating from the grandmaster are not forwarded but regenerated in every node, including in the network switches.

Control devices of a motor vehicle can be networked together easily by means of the Ethernet network. For instance, a plurality of cameras can be networked together by this means. The sensor data from the cameras can then also be fused, for instance. When using Ethernet TSN (and the PTP protocol), the respective control devices can each exchange additional information with each directly connected neighbor independently of one another. The motor vehicle usually contains fixed and hard-wired connections between control devices, i.e. control devices typically always have the same neighbors, and connections to new neighbors are not made.

The time synchronization protocol IEEE 1588 and its derivative IEEE 802.1AS (and in future IEEE 802.1AS-Rev) with the specific PTP or gPTP protocol (generalized precision time protocol) have made their appearance in vehicles. In this context, the protocol takes care of the transfer of time information, but does not provide any information about the integrity of the synchronization data (is the best clock actually the best clock, or can I trust the clock, or is the time correct?). Although time-triggered actions can be made to happen, the precision quality cannot be guaranteed. With Ethernet there is just one sender of synchronization messages. The time may have been corrupted by errors, temperature or even attacks.

In particular with regard to automated driving, time-controlled actions, for instance for synchronizing sensors such as, for example, cameras, lidar, radar and synchronizing their data streams, are becoming increasingly important. A plausibility check is desirable and necessary especially in this case. In particular, it is of interest to know whether an operation can be undertaken autonomously by the motor vehicle or whether the driver had better still keep control himself.

As yet there is still no reliable solution known for confirming the validity of a time stamp of an Ethernet message. The time stamp may be falsified deliberately, for example, in particular by an attack. The time stamp may also be invalid because there is no synchronization yet. It is also possible, however, that the time stamp is incorrect as a result of a bit rotator.

The question therefore arises, how is a fusion unit for sensor data meant to behave when it is supposed to fuse two packets but the time stamps do not match, i.e. lie far apart in time, or a required packet is not available. This does not necessarily mean that the data is old and unusable, but perhaps there is an error in the time stamp. Alternatively, the recipient may not trust the sender of the information or the software of said sender, for instance because a path is known to be untrustworthy. Thus even though the time stamp may be correct, the recipient still has no trust (perhaps a time change is currently taking place because of synchronization, or an update of the time synchronization software failed, or errors in the time protocol have suddenly become known, . . . ). It should also be mentioned that actually all the packets are important and in normal circumstances it is not possible to omit any; for instance, in a driver assistance system there is usually not the time, nor the opportunity, to re-request lost packets.

SUMMARY OF THE INVENTION

The object of the present invention is to provide a method and a control unit, in which, or by means of which, an incorrect time stamp of an Ethernet message can be identified more reliably and processed further.

This object is achieved by a method and a control unit according to the independent claims.

In a method according to the invention, an incorrect time stamp of an Ethernet message is identified. The following steps are carried out:

receiving an Ethernet message containing a time stamp by means of a control unit, in particular of a motor vehicle;

determining a time difference between a global time of the time stamp and a local time of a clock of the control unit, in particular by means of the control unit; and identifying the time stamp of the Ethernet message as incorrect, in particular by means of the control unit, if the time difference is greater than a time-difference limit value.

The invention is based on the realization that the control unit comprises a clock, in particular a clock that is integrated in the control unit, and the clock provides a local time that can be used to identify and/or to replace the incorrect time stamp. The incorrect time stamp can hence be identified reliably and the packet can be processed further.

For example, the Ethernet message may be in the form of a synchronization message or a sensor data message. Both the time synchronization message and the sensor data message comprise time information such as a time stamp, for instance. The time stamp may be incorrect, for example, because the time stamp may be deliberately falsified, or there is no synchronization yet between a sending control unit and the control unit, or there may be a bit rotator present.

Thus it is intended to validate or check the global time of the time stamp in order to be able to decide to process further the Ethernet message.

It is preferably provided that the global time of the time stamp is replaced by the local time of the clock of the control unit if the time stamp is incorrect or implausible. By replacing the global time with the local time, the Ethernet message can still be provided using an approximation of the global time that exists in the Ethernet. This is advantageous because the Ethernet message, for instance in the form of a sensor data message, can continue to be used and is not, as is the case for an incorrect time that differs widely from the global time, processed further incorrectly or discarded without being processed. This can be particularly advantageous if real-time acquisitions such as radar, camera and lidar are not buffered in the sensor, and therefore would otherwise no longer be available.

It is also preferably provided that the Ethernet message containing the time stamp containing the local time is processed further in the control unit and/or forwarded to an additional control unit, in particular of the motor vehicle.

The Ethernet message containing the local time is hence preferably processed further inside the control unit and/or forwarded to the additional control unit. The further processing or forwarding is performed preferably as an alternative to discarding the Ethernet message.

By virtue of the fact that the Ethernet messages comprise the local time instead of the incorrect time stamp, the Ethernet message containing the local time can be processed further and/or forwarded like an Ethernet message containing an incorrect time stamp. The time or time stamp is then substituted, for example, or it is noted that this time is not being used. Either a new time can be entered in the frame on arrival, or for this message a time can be generated in the system and forwarded together with the frame to the application or software.

It is also preferably provided that a global time of a time stamp of at least one additional Ethernet message following the Ethernet message is replaced by the local time of the clock of the control unit if the time stamp of the Ethernet message is incorrect. In particular, all related data for the same application can be processed further using the local time. If a plurality of data (streams) containing time stamps are fused and a stream thereof comprises errors in the time stamp, it can then be provided that after the identification, the global time stamp is removed and the local time stamp inserted for all the data streams (that are fused for an application). Applications may be: fusion unit, data logger, parallel execution on a plurality of control devices, etc.

It can also be advantageous if all the data or all related data is processed further using the local time permanently or for a certain time. Further processing using the local time can continue until the cause of the incorrect time information is found, or for a certain time length, or until the time at which an error no longer occurs.

The additional Ethernet message is likewise received by the control unit. The additional Ethernet message is received later in time than the Ethernet message, however. Hence it is now preferably provided that if the incorrect time stamp has been identified for the Ethernet message, it is assumed that the additional Ethernet message likewise has an incorrect time stamp. Extracting the time stamp of the additional Ethernet message and determining a time difference between the global time of the additional Ethernet message and the local time of the control unit can then be omitted simply by replacing the global time of the additional Ethernet message with the local time as a precaution. This is advantageous because the control unit can hence be operated with less effort or with lower computational effort.

It can also be provided that the Ethernet message is discarded without being processed if the time stamp is incorrect. Therefore it may also be the case that the Ethernet message is discarded after identification of the incorrect time stamp in order to prevent processing the Ethernet message further incorrectly, for instance by the control unit or an additional control unit.

It is also advantageously provided that a temperature value of a sending control unit that is sending the Ethernet message, in particular a sending control unit of the motor vehicle, is determined, and the time stamp is identified as incorrect if the temperature value is greater than a temperature limit value. By comparing the temperature value with the temperature limit value, it can be ascertained whether the sending control unit is overheated, and hence whether an error by the sending control unit when generating the time stamp can be assumed, or an increased risk of an error can be anticipated. The sending control unit may be, for instance, a varied control unit of the motor vehicle, which control unit has sent the Ethernet message in the transmit chain at least once before the receipt by the control unit. It is assumed that if the temperature value is greater than the temperature limit value, a calculation being performed in the sending control unit may contain errors. The time stamp can be identified as incorrect more reliably and accurately by means of the temperature value.

It may also be the case that a temperature value of a sending control unit that is sending the Ethernet message, in particular a sending control unit of the motor vehicle, is determined, and the time stamp is identified as incorrect if the temperature value is less than an additional temperature limit value. The additional temperature limit value is then effectively a minimum temperature value, on the basis of which an error in the time stamp is assumed if the sending control unit is too cold when sending or generating the time stamp, and the time stamp is therefore generated incorrectly.

It is also advantageously provided that a plurality of Ethernet messages are received, and a reception frequency of the Ethernet messages is determined, wherein the time difference is determined only if the reception frequency differs from a reception frequency reference value by less than a frequency tolerance value. Thus in particular the synchronization message is received by the control unit at regular intervals. If the difference, and hence the reception frequency, for an Ethernet message is greater than the frequency tolerance value, i.e. the Ethernet message is received too short a time after the preceding Ethernet message is received, or the Ethernet message is received too long a time after the preceding Ethernet message is received, then this is an indicator of an error, and the Ethernet message or the time stamp of the Ethernet message is identified as incorrect. If the reception frequency is greater than the frequency tolerance value, an error or an incorrect time stamp is hence already assumed, and therefore there is no longer any need to determine the time difference at all.

It is also preferably provided that it is verified whether a sending control unit that is sending the Ethernet message, in particular a sending control unit of the motor vehicle, is authorized to send, in particular directly, the Ethernet message to the control unit, and the time difference is only determined if the sending control unit is authorized. The authorization includes in particular determining whether the sending control unit is entitled to send the Ethernet message to the control unit. If the sending control unit is thus not authorized, an error is automatically assumed, and the time difference and hence the error determination based on the local clock are therefore no longer needed at all. Hence the effort involved in determining the time difference or in identifying the incorrect time stamp on the basis of the local time can be avoided. In addition, the incorrect time stamp can be identified more reliably.

It is also advantageously provided that a message type of the Ethernet message is determined, and the reception frequency is only determined and/or the Ethernet message is only verified with regard to authorization if the Ethernet message is in the form of a synchronization message. The message type defines in particular whether the Ethernet message is in the form of a synchronization message or a sensor data message. By determining the message type, it is possible to eliminate or omit verifying the reception frequency and/or the authorization if the Ethernet message is in the form of a sensor data message, for example. For instance the sensor data message is not received with the degree of regularity at which the synchronization message is regularly sent and received.

The invention also relates to a control unit for a motor vehicle. The control unit is configured to receive an Ethernet message containing a time stamp. In addition, the control unit is designed to determine a time difference between a global time of the time difference and a local time of a clock of the control unit. The control unit is also designed to identify the time stamp of the Ethernet message as incorrect if the time difference is greater than a time-difference limit value.

Said control unit is designed in particular as a control device for generating and/or outputting a control signal, or else as a network switch or as a fusion unit or as a sensor unit. For instance the control unit is designed in particular as an Ethernet communication unit in the Ethernet of the motor vehicle, which communication unit can send and/or receive an Ethernet message.

Furthermore, the invention also relates to a motor vehicle comprising a control unit according to the invention or an advantageous embodiment thereof.

Advantageous embodiments of the method according to the invention can be considered to be advantageous embodiments of the control unit and of the motor vehicle. The relevant components of the control unit and of the motor vehicle are each designed to perform the respective method steps.

Further features of the invention emerge from the claims, the figures and the description of the figures.

Exemplary embodiments of the invention will be explained in more detail below on the basis of schematic drawings.

DETAILED DESCRIPTION OF THE INVENTION

In the figures, identical or functionally identical elements are provided with identical reference signs.

Figure 1:
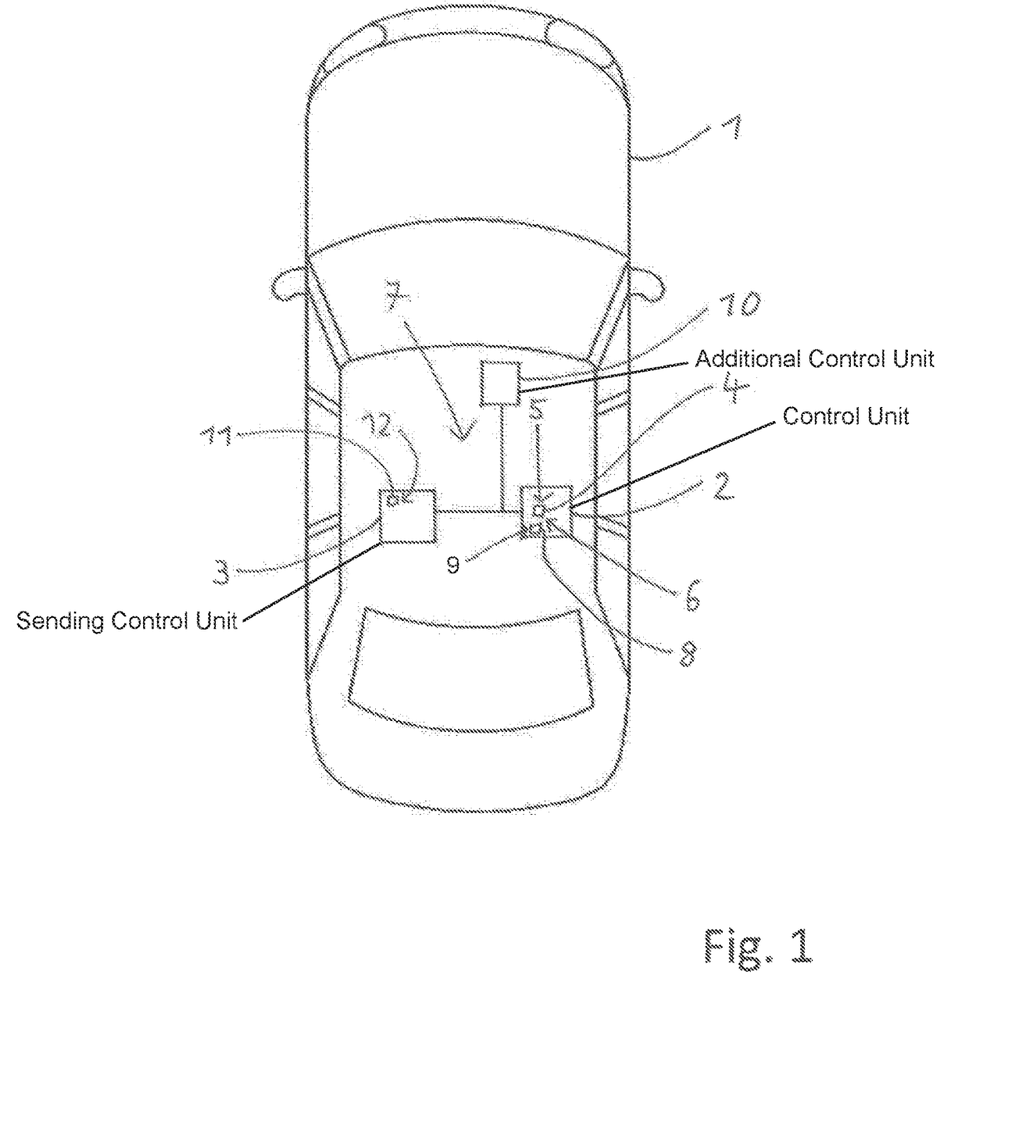
FIG. 1 shows a schematic plan view of an exemplary embodiment of a motor vehicle containing an exemplary embodiment of a control unit according to the invention.

FIG. 1 shows in plan view a motor vehicle 1 comprising a control unit 2. The motor vehicle 1 also comprises a sending control unit 3. The sending control unit 3 is connected to the control unit 2 for data transmission purposes. Both the control unit 2 and the sending control unit 3 can be embodied as a control device or as a communication unit or Ethernet communication unit or as a network switch.

The control unit 2 receives an Ethernet message 4. The Ethernet message 4 has a time stamp 5. The time stamp 5 in turn has, when received, a global time 6. The global time 6 is provided, according to the exemplary embodiment, by a best clock within an Ethernet 7 of the motor vehicle 1 or by a grandmaster of the Ethernet 7. According to the exemplary embodiment, the Ethernet 7 is embodied as a vehicle communication network of the motor vehicle 1 for the purpose of data transmission.

The control unit 2 comprises a clock 8. According to the exemplary embodiment, the clock 8 is integrated in the control unit 2. A local time 9 is provided by the clock 8. The clock 8 can be in the form of a crystal clock generator, for example.

According to the exemplary embodiment, the control unit 2 determines a time difference between the global time 6 and the local time 9.

According to the exemplary embodiment, the control unit 2 then compares the time difference with a time-difference limit value. If the time difference is greater than the time-difference limit value, the time stamp 5 is identified as incorrect. This means that there has been intentional tampering with the time stamp 5, for example, or an error occurred during generation of the time stamp 5, or an error occurred during transmission of the time stamp 5, or that the time stamp 5 is invalid because the control unit 2 and/or the sending control unit 3 are not yet synchronized in the Ethernet 7.

According to the exemplary embodiment, it is now provided that the global time 6 is replaced by the local time 9 if the time stamp 5 is incorrect or is identified as incorrect.

The Ethernet message 4 containing the local time 9 is then forwarded, according to the exemplary embodiment, to an additional control unit 10 of the motor vehicle 1. Additionally or alternatively, the Ethernet message 4 containing the local time 9 can also be processed further in the control unit 2 itself.

According to the exemplary embodiment, the sending control unit 3 comprises a temperature sensor 11. The temperature sensor 11 is used to determine a temperature value 12 of the sending control unit 3. Additionally or alternatively, the control unit 2 and/or the additional control unit 10 can also comprise a temperature sensor for determining an associated temperature value.

Figure 2:
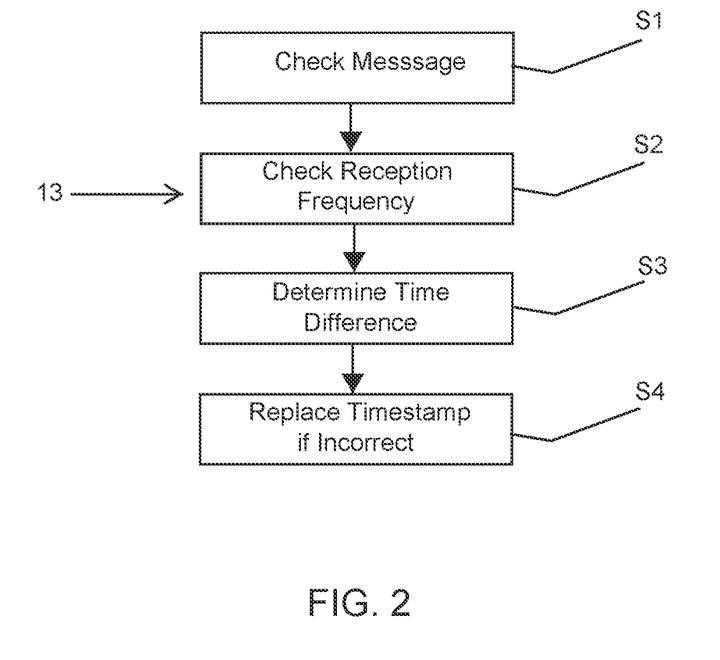
FIG. 2 shows a flow diagram of an exemplary embodiment of a method according to the invention.

FIG. 2 shows a flow diagram for the general procedure of an exemplary embodiment of the method. In a step S1, the Ethernet message 4 is checked, i.e. it is verified, as to whether the sending control unit 3 is authorized to send the Ethernet message 4. In step S2, it is also checked whether a reception frequency 13 differs from a reception frequency reference value by less than a frequency tolerance value.

In a step S3, the time difference is determined, and the time stamp 5 is identified as incorrect if the time difference is greater than the time-difference limit value. In a step S4, the global time 6 in the time stamp 5 is replaced finally by the local time 9 if the time stamp 5 is incorrect.

Figure 3:
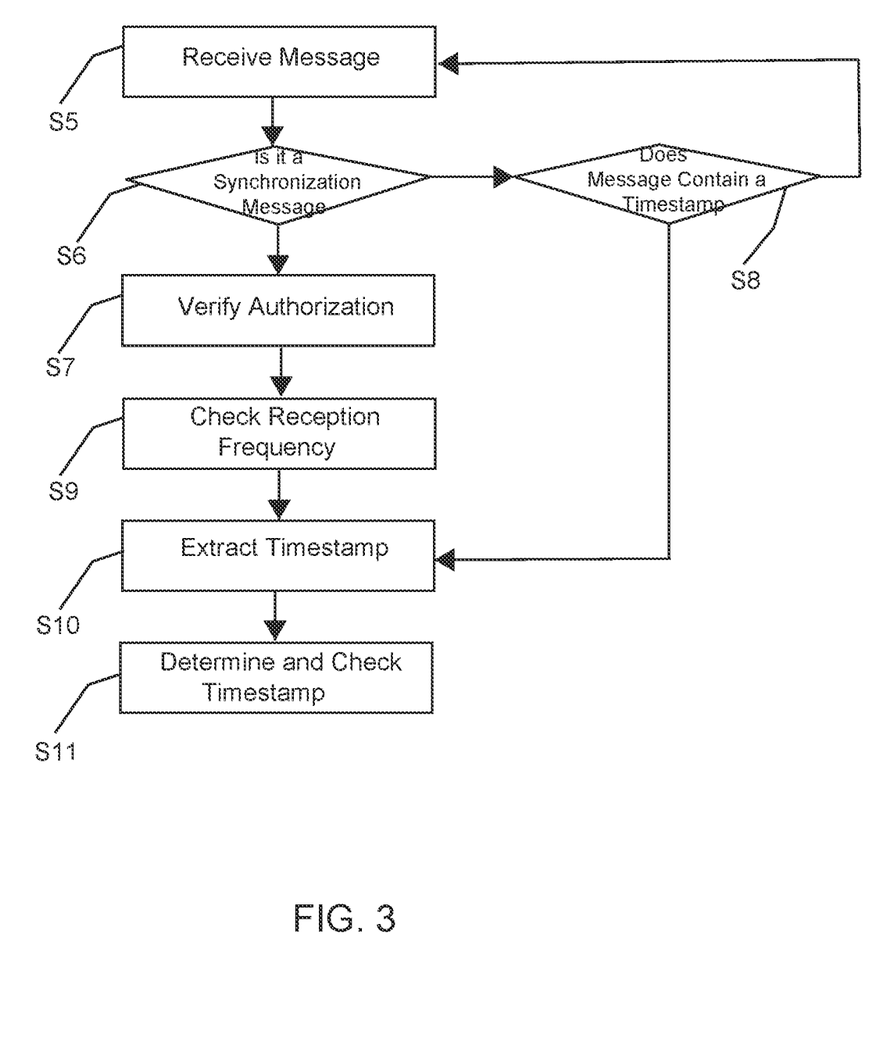
FIG. 3 shows a further flow diagram of an exemplary embodiment of the method, in which a message type of an Ethernet message is determined.

FIG. 3 shows a flow diagram for classifying messages having a synchronization background. In a step S5, the Ethernet message 4 is received by the control unit 2. In a step S6, it is decided whether the Ethernet message 4 is a synchronization message. If this is the case and a synchronization message is involved, there follows a step S7. If this is not the case and the Ethernet message 4 is not a synchronization message but, for instance, a sensor data message, there follows a step S8. In step S7 it is verified whether the sending control unit 3 is authorized to send the Ethernet message 4 to the control unit 2. If this is the case and the sending control unit 3 is authorized to do this, there follows a step S9. In step S9, the reception frequency 13 is determined and checked as to whether the reception frequency 13 is less than the frequency tolerance value and hence lies within a frequency tolerance range.

After step S9 there follows a step S10. In step S10, the time stamp 5 is extracted from the Ethernet message 4. There follows a step S11 in which the time difference is determined, and the time stamp 5 is checked for an error, i.e. is identified as incorrect or else is classified as correct.

In step S8 it is decided whether the Ethernet message 4 is a message containing a time stamp, so whether or not, for instance, it is a sensor data message containing a time stamp. If the Ethernet message 4 thus comprises the time stamp 5, there then follows the step S10. If the Ethernet message 4 does not comprise a time stamp 5, there then follows the step S5.

Figure 4:
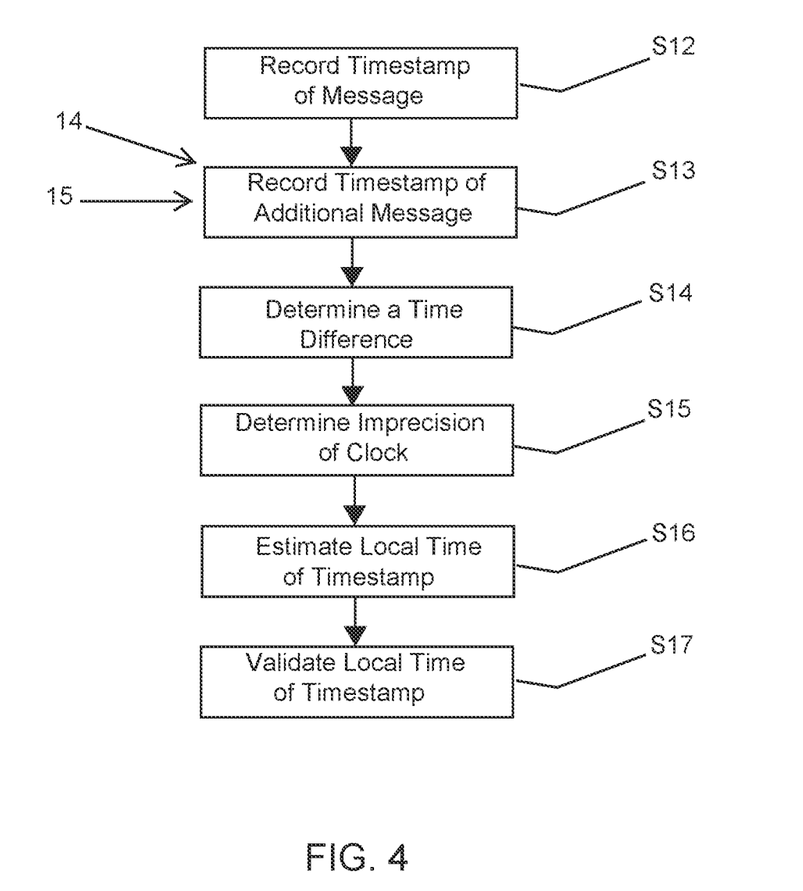
FIG. 4 shows a further flow diagram of an exemplary embodiment of the method.

FIG. 4 shows a flow diagram for validating the received time stamp 5. In a step S12, the time stamp 5 is recorded with the local time 9 when the Ethernet message 4 is received. In a step S13, a time stamp 14 of an additional Ethernet message 15 is recorded with the local time 9 when the additional Ethernet message 15 is received by the control unit 2.

In a step S14, the difference between the local time 9 in the time stamp 5 of the Ethernet message 4 and the local time 9 in the time stamp 14 of the additional Ethernet message 15 is calculated or determined. In a step S15, an imprecision in the clock 8 is determined by adding the local time 9 of the time stamp 5 of the Ethernet message 4 to the difference from step S14. In a step S16, an estimate of the local time 9 of the time stamp 14 of the additional Ethernet message 15 is determined on the basis of the results of step S16. For example, the clock 8 may be imprecise as a result of crystal drift and/or the effect of temperature.

In a step S17, the result from step S16 is validated.

The received Ethernet messages 4, 15 are stored together with the respective local times 9. It should be mentioned here that in this case of use, the local time 9 is taken rather than the synchronized time in order to avoid errors. This can also be repeated with further additional Ethernet messages. On the basis of the clock 8, the difference between the received local times 9 is determined and compared. The relative imprecision between the times should not be greater than the locally determined difference plus any variation within hardware specifications, which may be given in PPM (parts per million), for example.

If, for example, the interval for synchronization messages, in particular for the Ethernet message 4 and the additional Ethernet message 15, equals 100 ms, then, as an (arithmetic) average, 10 messages per second should also be received. The midpoint between two messages is meant to lie between 100 ms, although the receipt of the Ethernet messages 4, 15 can vary. The variation can be calculated or specified.

Optionally, additional parameters can also be used for checking the clock time or the clock 8 or the local time 9.

Figure 5:
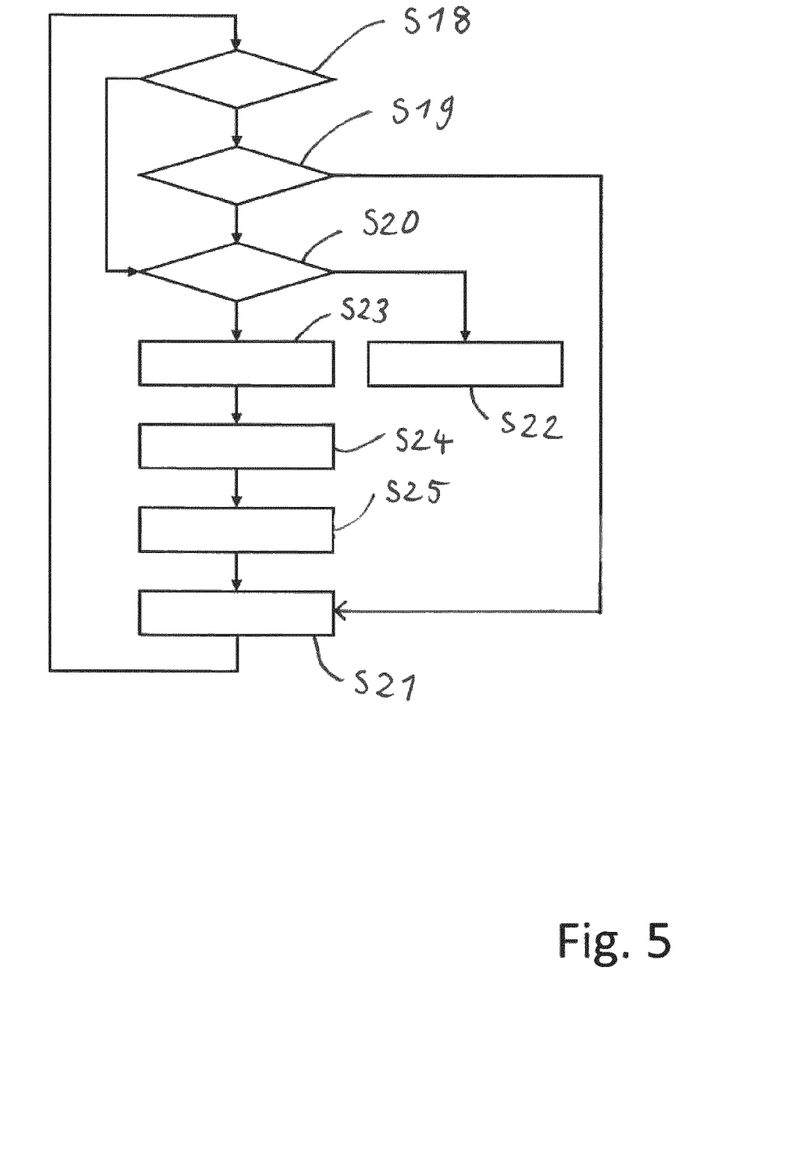
FIG. 5 shows a further flow diagram of an exemplary embodiment of the method.

FIG. 5 shows the time acquisition when there are validation problems and shows the switchover to this method. Since sensor data cannot be re-requested, for instance from a radar sensor or from a camera as these normally provide instantaneous acquisitions, the method proposes using the time stamp 5 containing the local time 9 in order to be able to use the sensor data nonetheless. In order to be able to use the time stamps 5, 14, the method proposes discarding for all the sensor streams the time stamps 5, 14 containing the global time 6, and on receipt to use new time stamps or the local time 9 of the clock 8 for the time stamps 5, 14 in order that the sensor data can be fused. Should the imprecision in the time stamps be less than half the sending frequency of the sensor data, then it is still possible to make a probably exact assignment. The control unit 2 may here be in the form of a fusion unit, for example, that receives a plurality of sensor data streams, for instance from an environment detection system of the motor vehicle 1.

In a step S18, it is decided whether for all the input ports or external physical interfaces of the control unit 2 there is trust in the time synchronization. If this is the case, there follows a step S19. If this is not the case, there follows a step S20. In step S19 it is decided whether there is trust in the time synchronization for this Ethernet message 4. If this is the case, there follows a step S21; if this is not the case, there follows the step S20. In step S20 it is decided whether there is trust in the sensor data belonging to the Ethernet message 4. If this is not the case, there follows a step S22, in which the Ethernet message 4 is discarded or else the lack of trust is recorded at least in a log file.

If, in step S20, there is trust in the associated sensor data, then because, the sensor is needed urgently, for instance, there follows a step S23, in which the time stamp 5 containing the global time stamp 6 is discarded. There follows a step S24, in which the time stamp 5 is created containing the local time 9. There also follows a step S25. In step S25, the time stamp 14 of the additional Ethernet message 15 is created containing the local time 9; in particular time stamps containing the local time 9 are created for all the additional Ethernet messages at the input ports of the control unit 2.

There follows the step S21, in which the Ethernet message 4 and, for instance, also the additional Ethernet message 15 are forwarded to the application.

LIST OF REFERENCE SIGNS

1 motor vehicle
2 control unit
3 sending control unit
4 Ethernet message
5 time stamp
6 global time
7 Ethernet
8 clock
9 local time
10 additional control unit
11 temperature sensor
12 temperature value
13 reception frequency
14 time stamp
15 additional Ethernet message

The invention claimed is:

1. A method for handling an Ethernet message containing an incorrect time stamp, which comprises the steps of:
    receiving the Ethernet message containing a time stamp by means of a control unit;
    determining a time difference between a global time of the time stamp of the Ethernet message and a local time of a clock of the control unit;
    identifying the time stamp of the Ethernet message as incorrect in response to determining that the time difference is greater than a time-difference limit value;
    replacing the global time of the time stamp of the Ethernet message with the local time of the clock of the control unit in response to identifying that the time stamp of the Ethernet message is incorrect; and
    replacing a global time of a time stamp of an additional Ethernet message with a local time of the clock of the control unit in response to the step of identifying that the time stamp of the Ethernet message is incorrect.

2. The method according to claim 1, which further comprises further processing the Ethernet message containing the time stamp containing the local time in the control unit and/or forwarding the Ethernet message to an additional control unit.

3. The method according to claim 1, which further comprises replacing the global time of an additional time stamp of at least one additional Ethernet message following the Ethernet message being replaced by the local time of the clock of the control unit in response to determining that the time stamp of the Ethernet message is incorrect.

4. The method according to claim 3, wherein for a plurality of, or all, subsequent additional Ethernet messages, which are used for a same application, the global time of the additional time stamp in each case is replaced by the local time of the clock of the control unit.

5. The method according to claim 3, wherein for a plurality of, or all, subsequent additional Ethernet messages, the global time of the additional time stamp in each case is replaced by the local time of the clock of the control unit, until a cause of incorrect time information is found, or for a certain time length, or until a time at which an error no longer occurs.

6. The method according to claim 1, which further comprises:
    determining a temperature value of a sending control unit that is sending the Ethernet message; and
    identifying the time stamp as incorrect in response to determining that the temperature value is greater than a temperature limit value.

7. The method according to claim 1, which further comprises:
    receiving a plurality of Ethernet messages;
    determining a reception frequency of the Ethernet messages; and
    determining the time difference only if in response to determining that the reception frequency differs from a reception frequency reference value by less than a frequency tolerance value.

8. The method according to claim 1, which further comprises verifying whether a sending control unit that is sending the Ethernet message is authorized to send the Ethernet message to the control unit, and the time difference is only determined in response to determining that the sending control unit is authorized.

9. The method according to claim 6, which further comprises determining a message type of the Ethernet message, and a reception frequency of the Ethernet message is only determined and/or the Ethernet message is only verified in response to determining that the Ethernet message is in a form of a synchronization message.

10. A system for a motor vehicle, the system comprising:
    a control unit implemented by a processor, said control unit configured to:
    receive an Ethernet message containing a time stamp;
    determine a time difference between a global time of the time stamp of the Ethernet message and a local time of a clock of said control unit;
    replace the time stamp of the Ethernet message with the local time of the clock of said control unit in response to determining that the time stamp of the Ethernet message is incorrect; and
    replace a time stamp of an additional Ethernet message with a local time of the clock of the control unit in response to the determining that the time stamp of the Ethernet message is incorrect.

11. The system according to claim 10, wherein said control unit is configured to identify the time stamp of the Ethernet message as incorrect in response to determining that the time difference is greater than a time-difference limit value.

\* \* \* \* \*